United States Patent
Kohda (10) Patent No.: US 7,387,448 B2
(45) Date of Patent: Jun. 17, 2008

(54) OPTICAL COMPONENT, METHOD FOR CONNECTING THE SAME, AND OPTICAL MODULE HAVING THE OPTICAL COMPONENT

(75) Inventor: Hiroshi Kohda, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/828,072

(22) Filed: Jul. 25, 2007

(65) Prior Publication Data

US 2007/0263962 A1 Nov. 15, 2007

Related U.S. Application Data

(62) Division of application No. 11/198,303, filed on Aug. 8, 2005, now abandoned.

(30) Foreign Application Priority Data

Aug. 17, 2004 (JP) ............................. 2004-237349

(51) Int. Cl.
*G02B 6/32* (2006.01)
*G02B 6/36* (2006.01)

(52) U.S. Cl. ..................... 385/85; 385/34; 385/78; 359/708

(58) Field of Classification Search ................. 385/33, 385/34, 78, 85; 359/708
See application file for complete search history.

(56) References Cited

U.S. PATENT DOCUMENTS

| | | | |
|---|---|---|---|
| 5,159,655 A | 10/1992 | Ziebol et al. | 385/81 |
| 5,351,327 A * | 9/1994 | Lurie et al. | 385/78 |
| 5,764,836 A * | 6/1998 | Roff | 385/88 |
| 6,217,231 B1 | 4/2001 | Mesaki et al. | 385/88 |
| 6,404,954 B1 | 6/2002 | Zhu et al. | 385/34 |
| 6,599,029 B2 * | 7/2003 | Yamazaki et al. | 385/80 |
| 6,701,040 B2 | 3/2004 | Li et al. | 385/84 |
| 6,744,944 B2 * | 6/2004 | Matsuura et al. | 385/24 |
| 2002/0118929 A1 | 8/2002 | Brun et al. | 385/84 |
| 2003/0081897 A1 | 5/2003 | Itoh et al. | 385/34 |
| 2004/0062478 A1 | 4/2004 | Ludington et al. | |

FOREIGN PATENT DOCUMENTS

| | | |
|---|---|---|
| CN | 1409144 A | 4/2003 |
| CN | 1497281 A | 5/2004 |
| JP | 11-160563 A | 6/1999 |
| JP | 2002-006178 A | 1/2002 |

* cited by examiner

*Primary Examiner*—Sung Pak
*Assistant Examiner*—Daniel Petkovsek
(74) *Attorney, Agent, or Firm*—Global IP Counselors, LLP (57) ABSTRACT

There are provided a substantially cylindrical optical component, a method for connecting the same, and an optical module having the optical component, whereby adequate gripping force can be exerted during positioning or fixing, and the position in the azimuthal angle about the cylinder axis can be easily aligned. The optical component comprises a substantially cylindrical elongated member, an outer peripheral portion of which includes a cylindrical portion and a side plane portion that has a flat surface, the flat surface being parallel to a central axis to the elongated member. The optical module is composed of a planar light circuit device connected to a rod lens or capillary. With the method for connecting the optical component, the optical component of the present invention is positioned using the side plane portion as a reference, and is connected to another optical component.

4 Claims, 9 Drawing Sheets

FIG. 9

OPTICAL COMPONENT, METHOD FOR CONNECTING THE SAME, AND OPTICAL MODULE HAVING THE OPTICAL COMPONENT

CROSS-REFERENCE TO RELATED APPLICATIONS

This application is a divisional application of U.S. patent application Ser. No. 11/198,303 filed on Aug. 8, 2005, now abandoned. The entire disclosures of U.S. patent application Ser. No. 11/198,303 is hereby incorporated herein by reference.

BACKGROUND OF THE INVENTION

1. Field of the Invention

The present invention relates to an optical component having a substantially cylindrical external shape, to a method for connecting the same, and to an optical module having the optical component.

2. Description of the Related Art

A capillary for an optical fiber is disclosed in Japanese Unexamined Patent Application Publication No. 11-160563 as an example of an optical component used for connecting an optical fiber to another optical fiber or optical device in the field of optical communications. An optical fiber is positioned so that the optical fiber optically connects with another optical fiber or optical device while the glass portion thereof is being inserted in the capillary. The capillary is generally cylindrical in shape, and is formed from ceramics or glass. A capillary formed from glass can be manufactured at low cost and with good precision of dimensions and symmetry by extending cylindrical glass tube to a small diameter. Such cylindrical optical component can be easily positioned with respect to all degrees of freedom other than the azimuthal angle about the cylinder axis, using the lateral surface of the cylinder as a reference.

While a cylindrical optical component such as the one described above is polished on the end face thereof or positioned with respect to another optical component or optical device, the lateral surface of the cylinder is gripped by a gripping member. Since the optical component and the gripping member come into contact with each other only at a point or a line parallel to the cylinder axis on the lateral surface of the cylinder, it is difficult to obtain a gripping force (frictional force) sufficient to position or fix the optical component. The optical component then comes out of position while polishing its end face, and polishing cannot be performed correctly, and the component becomes misaligned during connection to another optical component or optical device due to shrinkage of the adhesive when cured. When the force with which the optical component is gripped is increased in order to obtain adequate gripping force, the optical component may be damaged if it is composed of glass or another fragile material.

With an optical component whose end face is polished at an inclination angle with respect to the plane orthogonal to the cylinder axis, or an optical component such as one in which a plurality of optical fibers are inserted, its azimuthal angle about the cylinder axis must be aligned when the component is to be connected to another optical component or optical device. However, since the external peripheral shape of a cylindrical optical component is rotationally symmetrical with respect to the central axis of the cylinder, it is impossible to align the azimuthal angle about the cylinder axis using the external periphery as a reference.

SUMMARY OF THE INVENTION

An object of the present invention is to provide a substantially cylindrical optical component to which adequate gripping force can be exerted during positioning or fixing of the optical component, and which can be aligned in the azimuthal angle about the cylinder axis, a method for connecting the optical component, and an optical module having the optical component.

In order to achieve the above-mentioned objects, an optical component comprises a substantially cylindrical elongated member, an outer peripheral portion of which includes a cylindrical portion and a side plane portion that has a flat surface, the flat surface being parallel to a central axis to the elongated member.

The elongated member may be composed of a rod lens. In this case, the rod lens may have an end face portion having a flat surface tilted with respect to the central axis of the elongated member. The optical component may also have an optical fiber fixed at one end to the other end of the rod lens. The elongated member may also be composed of a lens and a lens holder.

Alternatively, the elongated member may be composed of an optical fiber capillary having one or more holes for insertion of an optical fiber parallel to the central axis of the elongated member. In this case, the capillary may have a plurality of holes. The capillary may have an end face portion having a flat surface tilted with respect to the central axis of the elongated member. The optical component may also have an optical fiber fixed at one end portion in the one or more holes. The optical fiber may be a polarization maintaining fiber.

An optical module composed of the optical component of the present invention is provided as an aspect of the present invention. The optical module may be composed of a rod lens as the elongated member, an optical fiber being fixed to the rod lens, and a planar light circuit device connected to the other end face of the rod lens. The optical module may be composed of a capillary as the elongated member, an optical fiber being fixed to the capillary, and a planar light circuit device connected to the capillary. Yet another aspect of the present invention is a method for connecting an optical component whereby the optical component of the present invention is positioned and connected to another optical component using the side plane portion thereof as a reference.

BRIEF DESCRIPTION OF THE DRAWINGS

These and other features, aspects, and advantages of the present invention will become better understood with regard to the following description, appended claims, and accompanying drawings where:

FIGS. 8A and 8B are schematic drawings of a fourth embodiment of the optical component according to the present invention, wherein FIG. 8A is a perspective view showing a case in which the elongated member does not have a holder, and FIG. 8B is a perspective view of a case in which the elongated member has a holder.

DESCRIPTION OF THE PREFERRED EMBODIMENTS

Figure 1:
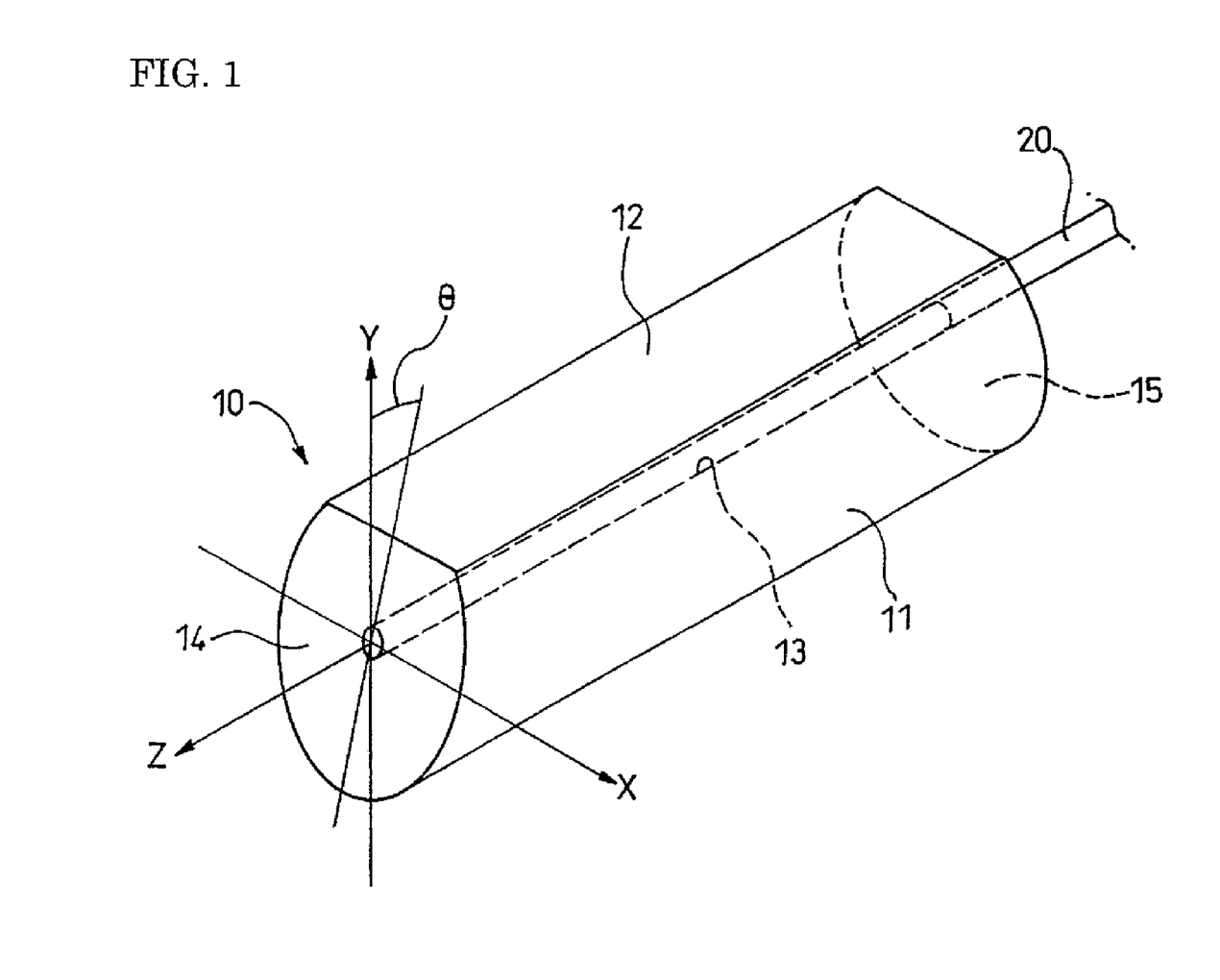
FIG. 1 is a perspective view of a first embodiment of the optical component according to the present invention.

FIG. 1 is a perspective view of a first embodiment of the optical component according to the present invention. The optical component shown in FIG. 1 is an elongated member, so-called capillary 10 into which an optical fiber is inserted. The capillary 10 has a cylindrical portion 11 that is a portion of the lateral surface of the capillary 10. The coordinate system XYZ is a Cartesian coordinate system, wherein the central axis of the cylinder lies along the Z-axis. An optical fiber retaining hole 13 for insertion of an optical fiber is provided inside the capillary 10 parallel to the central axis of the cylinder so as to have a slightly larger internal diameter than the external diameter of the optical fiber. The central axis of the optical fiber retaining hole 13 coincides with the Z-axis.

An optical fiber 20 is fixed within the capillary 10 with an adhesive in a state in which one end portion of the optical fiber 20 is inserted into the optical fiber retaining hole 13. The optical axis of the optical fiber 20 substantially coincides with the Z-axis at the one end portion thereof. One end of the optical fiber 20 is positioned so as to substantially coincide with the connecting end face (the front end face in FIG. 1) 14 of the capillary 10, and is polished together with the connecting end face 14 of the capillary 10. The other end portion of the optical fiber 20 protrudes from the back end face 15 of the capillary 10.

The connecting end face 14, which is the end face that is to be connected to another optical component or the like, includes the X-axis and is somewhat tilted with respect to the XY-plane. The angle θ of this tilt is 8°, for example. By polishing the connecting end face 14 to a mirror finish at an angle, the effects of backward propagation light due to Fresnel reflection can be minimized when the optical component is connected to another optical component or the like. The back end face 15 is fitted inside another cylindrical member not shown in the drawing, whereby a ferrule having the capillary 10 is formed. The ferrule is placed in an optical connector.

A side plane portion 12 having a flat surface parallel to the central axis of the cylinder is provided to a portion of the lateral surface of the capillary 10. This side plane portion 12 is adapted for gripping the capillary 10.

Figure 2:
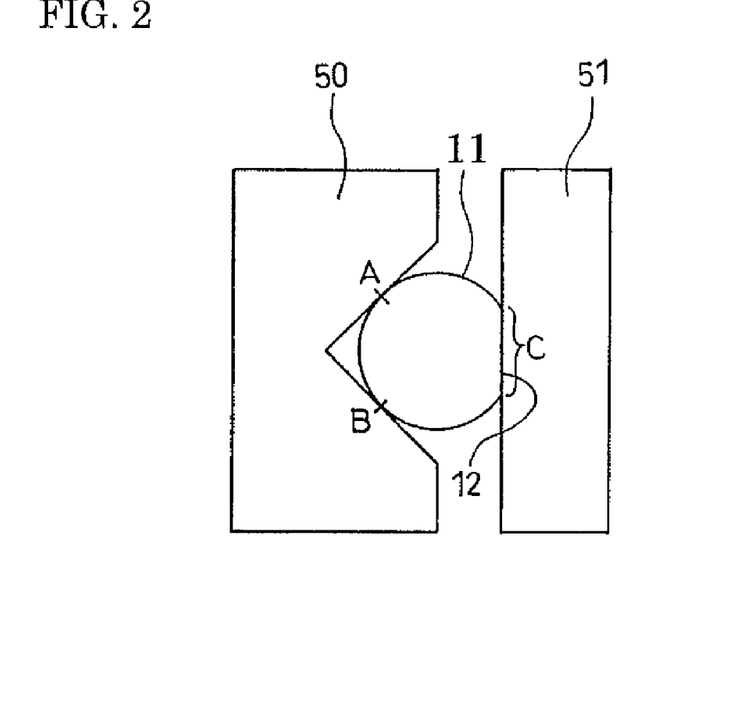
FIG. 2 is a cross-sectional view showing the manner in which the optical component of the first embodiment is gripped.

FIG. 2 is a cross-sectional view showing the manner in which the optical component of the first embodiment is gripped. When the capillary 10 is gripped by a gripping member 50 having a V-shaped groove and flat planar gripping member 51, the cylindrical portion 11 can be in contact with the gripping member 50 along the lines that extend in the Z-axis direction through points A and B and the side plane portion 12 can be in contact with the surface of the gripping member 51 in the area C extending in the Z-axis direction.

The gripping force exerted on the capillary 10 can thus be increased, and when the connecting end face 14 is polished, or when the capillary 10 is aligned with and connected to another optical component, the capillary 10 can be held with adequate force, while securing satisfactory precision. Furthermore, in aligning the azimuthal angle about the Z-axis of the connecting end face 14 with that of the connecting surface of another optical component, the azimuthal angle about the Z-axis can be easily aligned with respect to the side plane portion 12. By keeping the side plane portion parallel to the Z-axis, it is possible to determine the direction of the Z-axis from the lateral flat surface, which is the external shape. Thus, the cylindrical axis of the elongated member or the central axis of the optical fiber can be easily aligned using the flat portion of the lateral surface as a reference.

Figure 3:
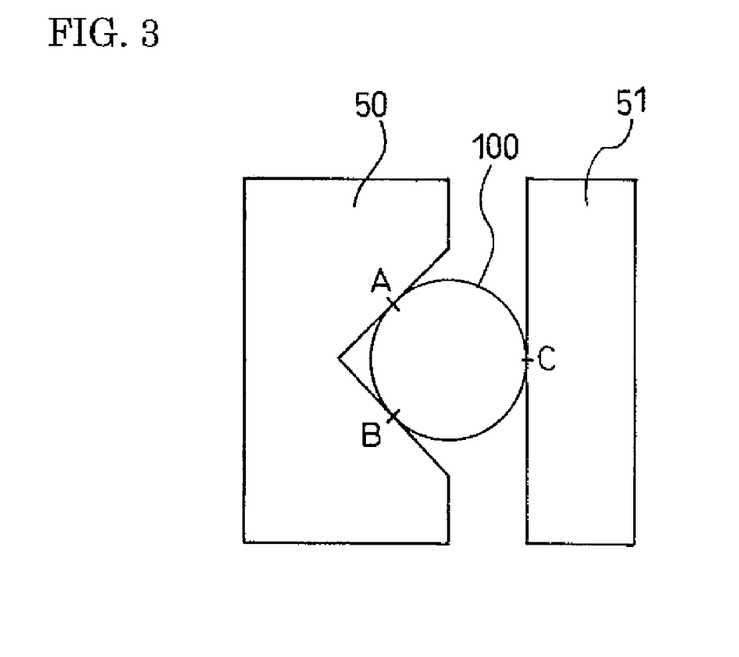
FIG. 3 is a cross-sectional view showing the manner in which a conventional optical component is gripped.

FIG. 3 is a cross-sectional view showing the manner in which a conventional optical component is gripped. In the conventional capillary, the lateral surface of the cylinder of the capillary 100 is in contact with the gripping members 50 and 51 along only the lines that extend in the Z-axis direction through points A, B, and C, so an adequate gripping force is difficult to obtain.

The capillary 10 of the present embodiment may be formed from quartz glass, plastic, zirconia, stainless steel, or another material. The side plane portion 12 may be formed by being polished with an abrasive or ground with a rotary blade. When the capillary 10 is formed from quartz glass or another transparent member, an ultraviolet-curable adhesive may be used as the adhesive for affixing the optical fiber 20 inside the optical fiber retaining hole 13.

The optical fiber 20 may be a polarization-maintaining fiber. In this case, the direction of the polarization plane, in which linear polarization is maintained, can be determined from the position of the side plane portion 12 by arranging its polarization plane perpendicular or parallel to the side plane portion 12. The azimuthal angle about the Z-axis of the capillary 10 can thereby be aligned using the side plane portion 12 as a reference when the capillary 10 is connected to another optical component or the like, and the polarization plane of the optical fiber 20 can be arranged in any desired direction. Thus, it is possible to achieve a connection having good polarization maintaining characteristics.

Figure 4:
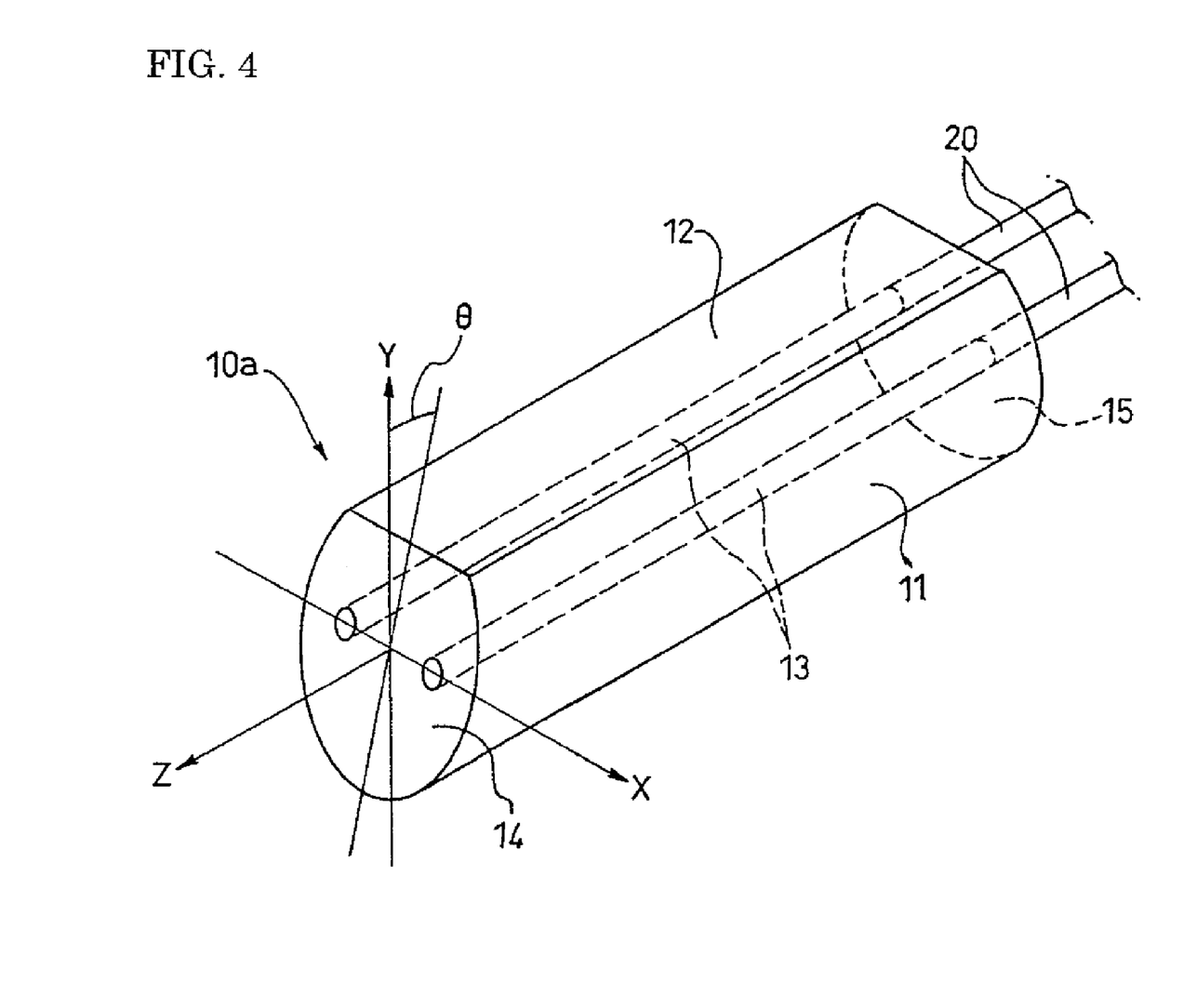
FIG. 4 is a perspective view of a second embodiment of the optical component according to the present invention.

FIG. 4 is a perspective view of a second embodiment of the optical component according to the present invention. The optical component shown in FIG. 4 is an elongated member, so-called capillary 10a, in which a plurality of optical fiber retaining holes 13 is formed parallel to the Z-axis. In this case, the optical fiber retaining holes 13 is desirably arranged symmetrically with respect to the YZ plane, and the side plane portion 12 is desirably parallel to the XZ plane. The azimuthal angle about the Z-axis is also aligned for the capillary 10a in order to align the optical axis thereof for connection to another optical component or optical device. In this regard, the azimuthal angle about the Z-axis of the capillary 10a can easily be aligned using the side plane portion 12 as a reference.

Figure 5:
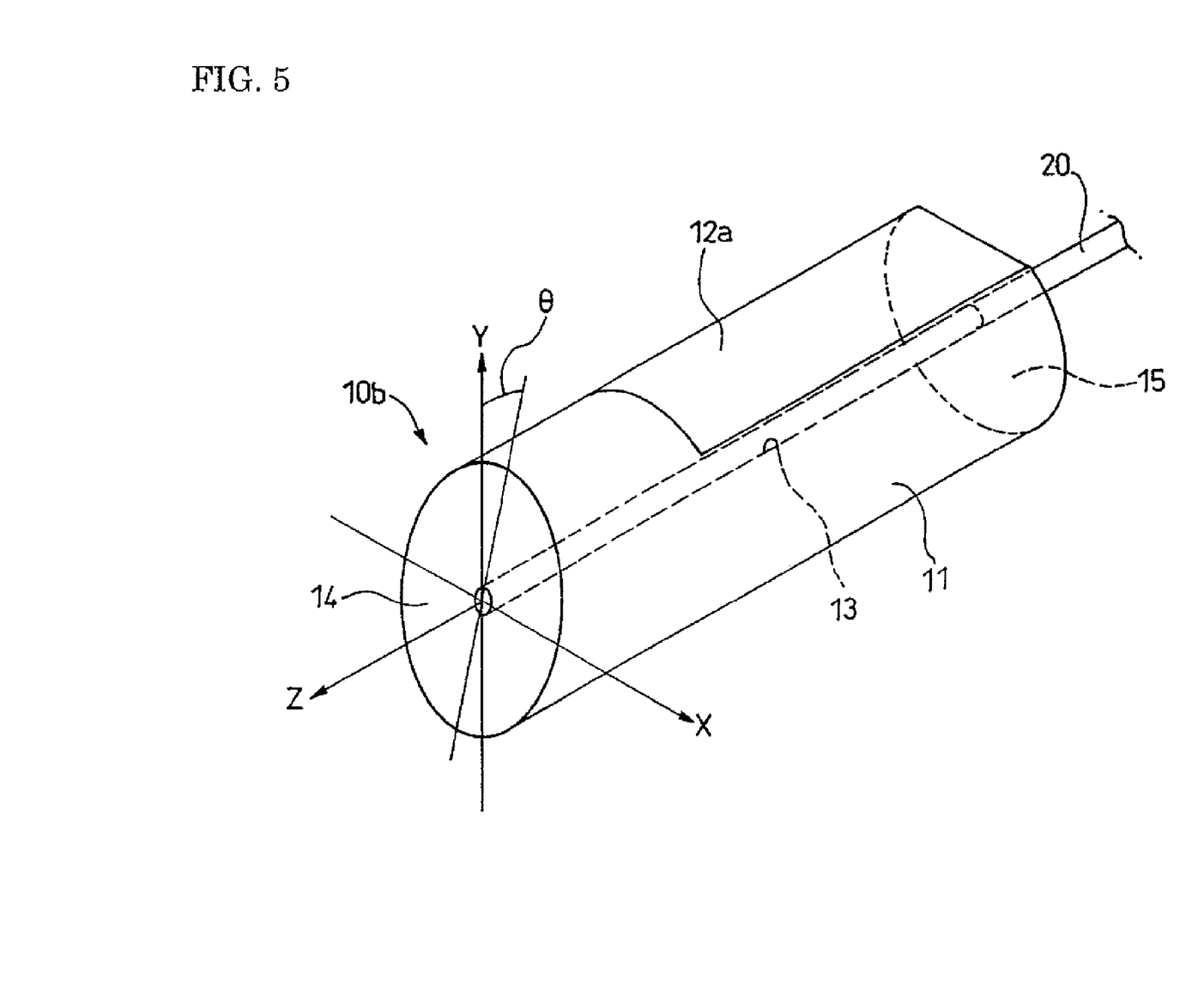
FIG. 5 is a perspective view of a third embodiment of the optical component according to the present invention.

FIG. 5 is a perspective view of a third embodiment of the optical component according to the present invention. The optical component shown in FIG. 5 is an elongated member, so-called capillary 10b, in which a side plane portion 12a is formed in only a portion of the capillary 10b in the longitudinal direction of the capillary 10b. However, the force for fixing the capillary 10b tends to decrease so as to be commensurate with a reduction in the surface area of the side plane portion 12b.

Figure 8A:
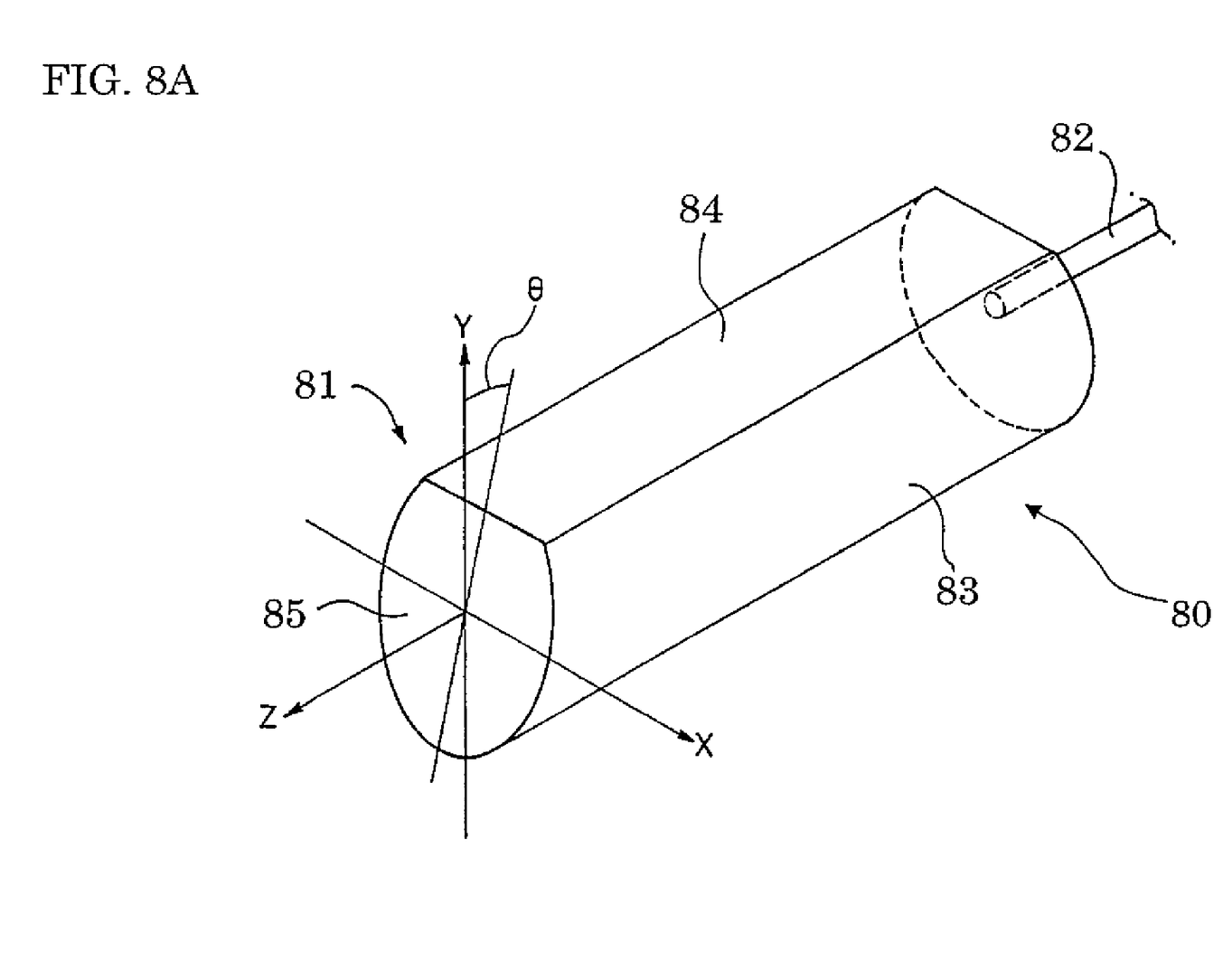
Figure 8B:
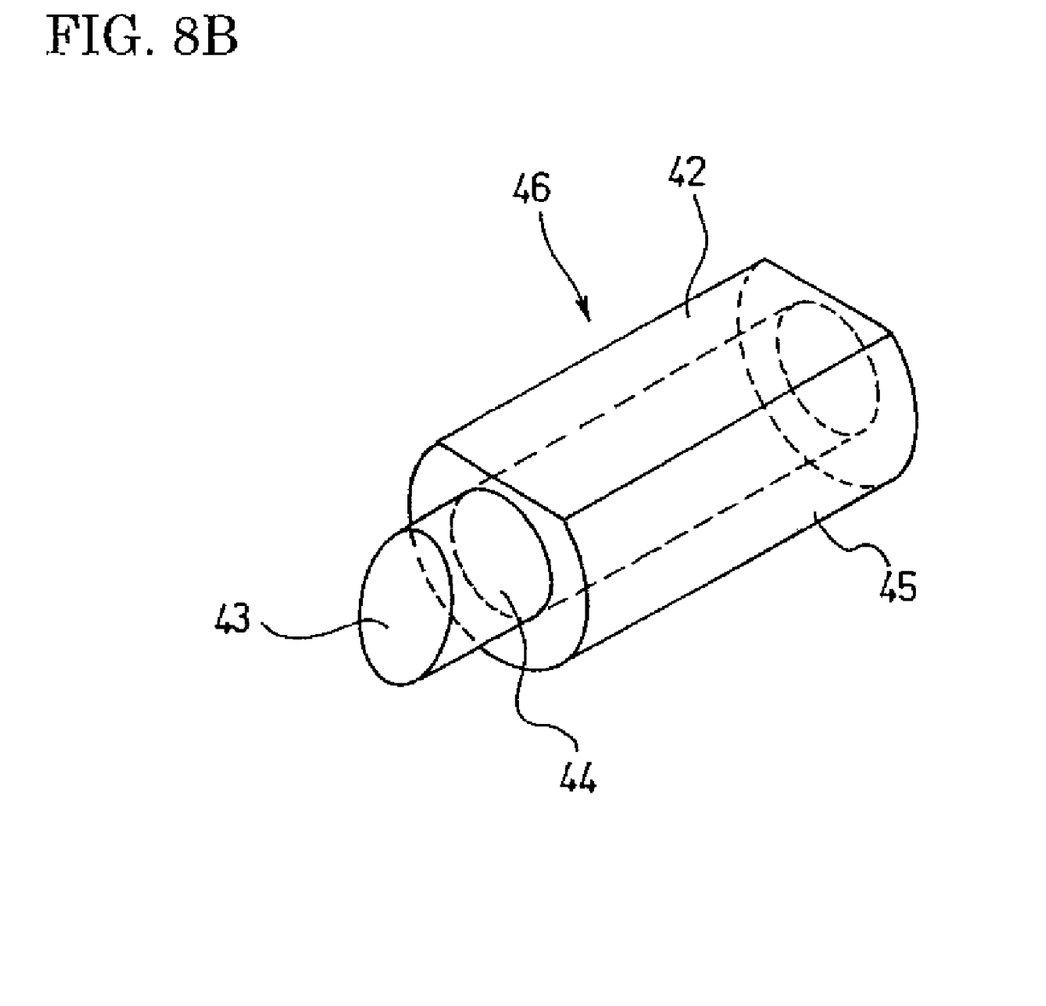

FIGS. 8A and 8B are schematic drawings of a fourth embodiment of the optical component according to the present invention, and FIG. 8A is a perspective view showing a case in which the elongated member does not have a lens holder. XYZ is a Cartesian coordinate system. The optical component 80 is composed of an elongated member, so called rod lens 81, and an optical fiber 82. The rod lens 81 has a cylindrical surface portion 83 that is a portion of the lateral surface of the cylinder. The rod lens 81 also has a side plane portion 84 having a flat surface parallel to the central axis Z of the cylinder, and an end face portion 85 having a flat surface tilted with respect to the central axis Z of the cylinder. The end face includes the X-axis and is tilted at an angle θ with respect to the Y-axis. The side plane portion 84 is formed parallel to the XZ plane. The optical fiber 85 is joined and fixed to the end face of the rod lens.

FIG. 8B is a perspective view showing a case in which the elongated member has a lens holder. The optical component is an elongated member, so called lens module 46, composed of a lens main body 44 and a cylindrical lens holder 45 on the outside thereof. In this case, a configuration may be adopted in which a side plane portion 42 is not provided to the lens main body portion, and the side plane portion 42 is formed only in the external peripheral portion of the lens holder 45.

Figure 6:
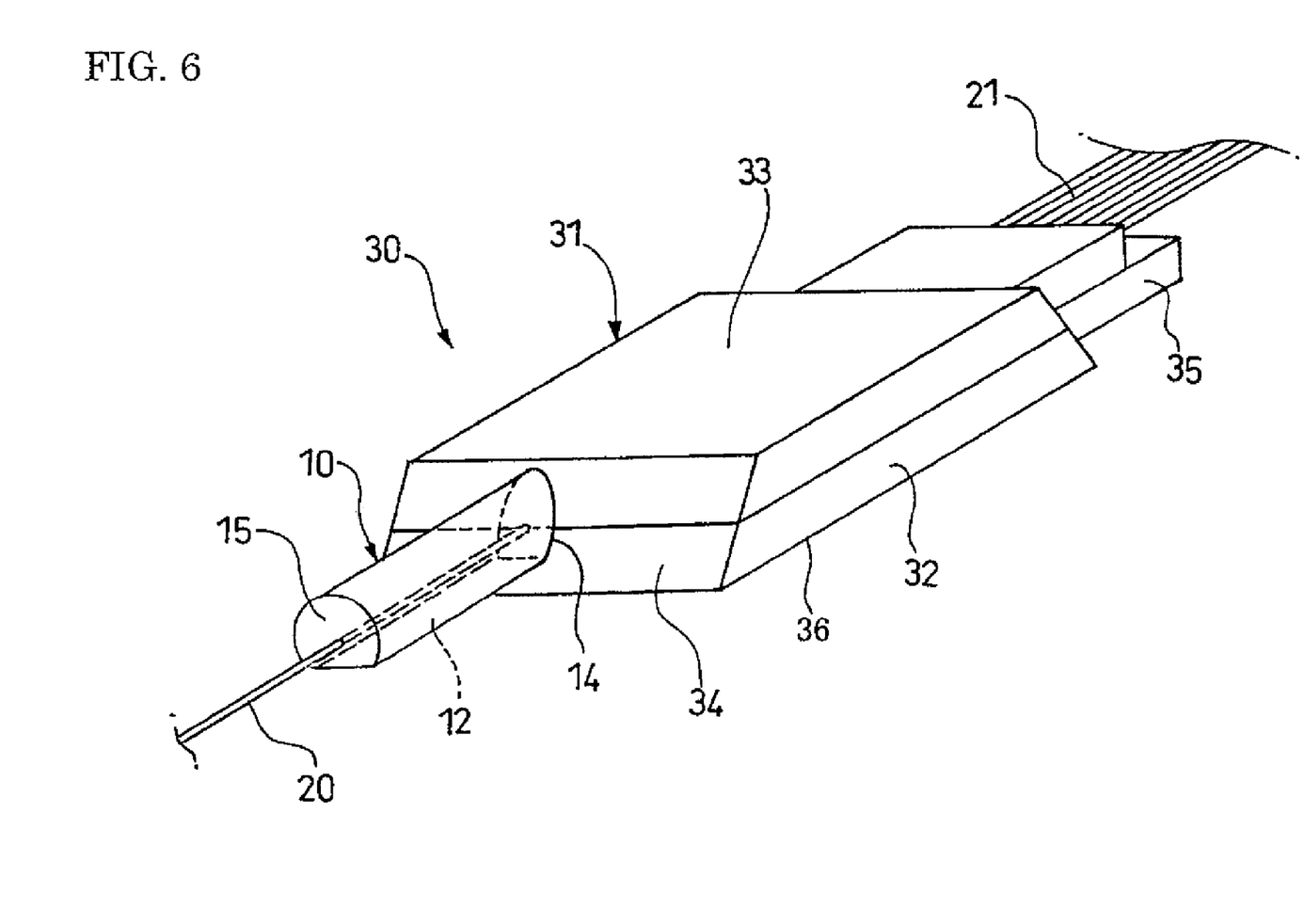
FIG. 6 is a perspective view of a first embodiment of the optical module according to the present invention.

FIG. 6 is a perspective view of a first embodiment of the optical module according to the present invention. The optical module 30 is composed of the capillary 10, which is the first embodiment of the optical component according to the present invention, and a planar light circuit device 31 connected to the capillary 10. The tilted connecting end face 14 of the capillary 10 is joined by an adhesive to the connecting end face 34 tilted at an 8-degree angle in the planar light circuit device 31, whereby the optical fiber 20 inserted into the capillary 10 and guided out from the end face 15 is optically connected to the planar light circuit device 31.

The capillary 10 undergoes high-precision end face processing while being gripped using the side plane portion 12 as the contacting surface, and is connected to the planar light circuit device 31 while the optical axes are aligned with each other with high-precision as the capillary is gripped using the side plane portion 12 as the contacting surface, whereby extremely low connection loss can be achieved. When the azimuthal angle about the Z-axis of the capillary 10 is aligned in order to match the azimuth angles of the connecting end face 14 and the connecting end face 34, the azimuthal angle about the cylinder axis can be aligned with high precision by aligning the side plane portion 12 parallel to, for example, the bottom surface 36 of the waveguide base 32, using the side plane portion 12 as a reference. An optical module of a light circuit device type having low transmission loss can thereby be obtained. Besides ease of alignment, yield with respect to a prescribed specification also increases, and the cost of the corresponding optical module is reduced.

The planar light circuit device 31 may be a waveguide-type optical component having a function as an optical splitter. The planar light circuit device 31 is configured so that a waveguide pattern is formed by CVD, etching, or another method on the top surface of the waveguide base 32, and a reinforcing plate 33 is further provided thereon. The above-mentioned capillary 10 is connected to the connecting end face 34, and an optical fiber array 35 having a plurality of parallelly arranged optical fibers 21 is connected to the other end face of the planar light circuit device 31. The optical fiber array 35 has a plurality of V-shaped grooves formed therein for positioning the optical fibers 21 and can arrange, for example, 48 strands of optical fibers 21. With the optical module 30 having this type of configuration, light transmitted through the optical fiber 20 inserted in the capillary 10 can be split and transmitted to each of the optical fibers 21.

Figure 7:
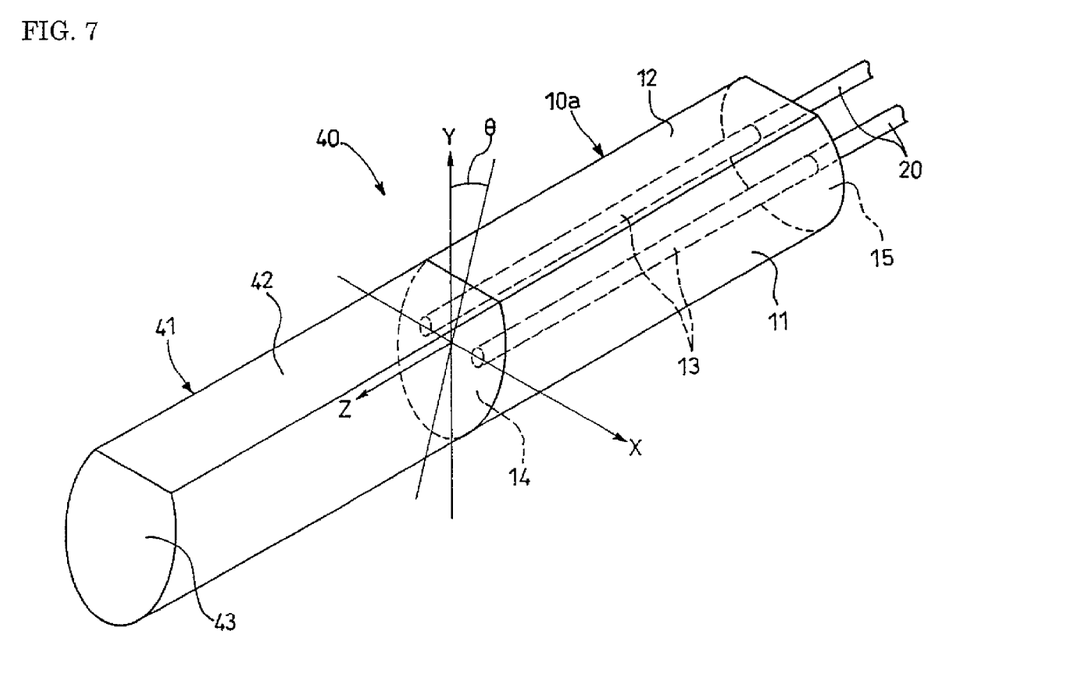
FIG. 7 is a perspective view of a second embodiment of the optical module according to the present invention.

FIG. 7 is a perspective view of a second embodiment of the optical module according to the present invention. The optical module of the second embodiment is a so-called collimator 40, in which the substantially cylindrical rod lens 41, which is the optical component of the present invention, is connected to the connecting end face 14 of the capillary 10a. The cylinder axis of the rod lens 41 is arranged so as to coincide with the cylinder axis of the capillary 10a, and the azimuthal angle about he axis are aligned so that the side plane portion 42, which is formed in the same manner as the capillary 10a, is parallel to the side plane portion 12 of the capillary 10a. Both end faces of the lens 41 are also formed in a plane that is tilted substantially 8° with respect to the YX plane in the drawing so as to have the same tilt angle as the connecting end face 14 of the capillary 10a.

The rod lens 41 is a so-called grin (GRIN) lens, which has the function to collimate the light that enters from one end and emitting the collimated light from the other end. A GRIN lens is a lens made of quartz glass that has the highest index of refraction in the central axis portion, with the index of refraction gradually decreasing toward the outside in the radial direction from the central axis portion. By arranging the side plane portion 42 parallel to the side plane portion 12 of the capillary 10a, the optical characteristics of the rod lens 41 can be equalized for the two strands of optical fiber 20.

In the collimator 40 of the present embodiment, light entering from the optical fiber 20 held in the capillary 10a is emitted from the end face 43 so as to be parallel to the central axis. The collimated light entering from the end face 43 is emitted towards the optical fibers 20 in a condensed state. Specifically, by providing two of the collimators 40 shown in FIG. 7 while aligning their axes with the end faces 43 facing each other, and aligning the azimuthal angle about the axes using the side plane portion 42 as a reference, the optical module can be made into a collimation conversion system.

Figure 9:
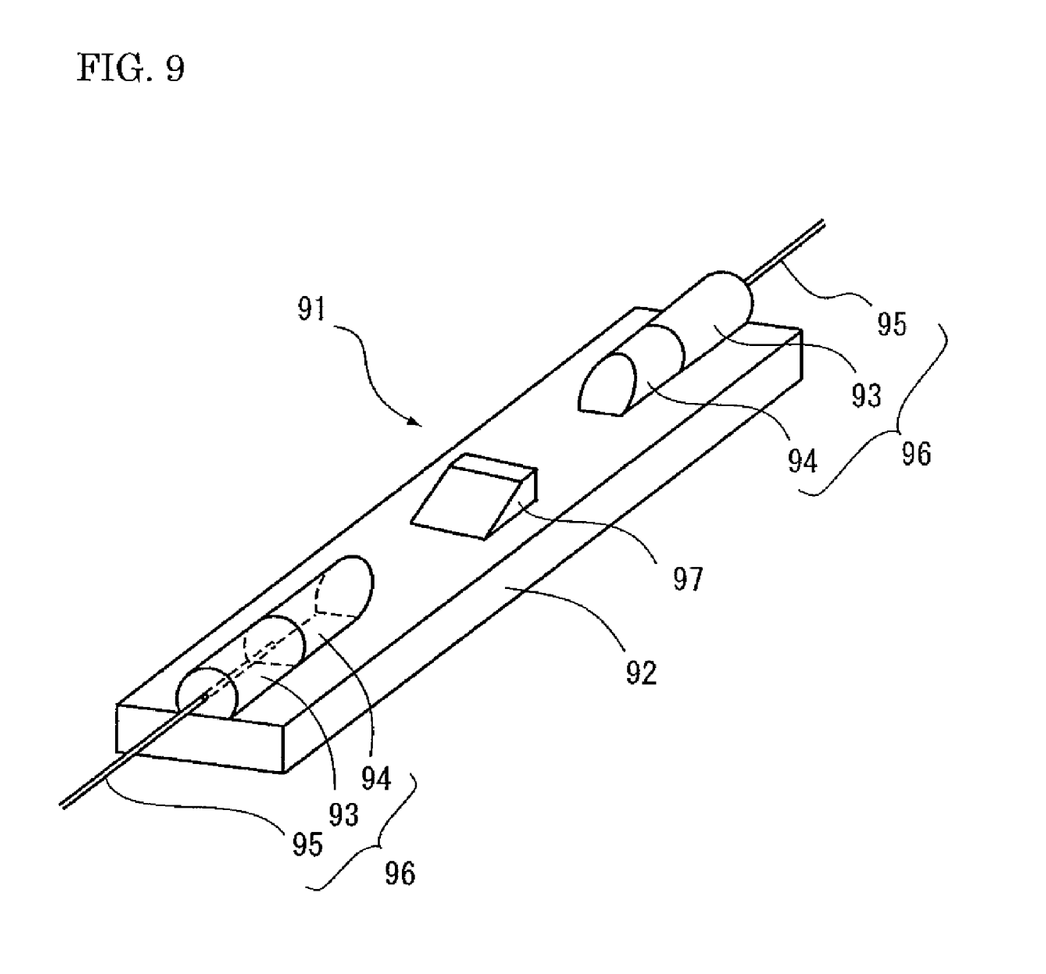
FIG. 9 is a perspective view of a third embodiment of the optical module according to the present invention.

FIG. 9 is a perspective view of a third embodiment of the optical module according to the present invention. In the optical module 91, collimators 96 each having a capillary 93, a rod lens 94, and an optical fiber 95 are disposed on both end portions of a base 92, and a bandpass filter 97 is disposed between the collimators so as to act as a filter for allowing only a prescribed wavelength of light to pass through. The side plane portions of the collimators 40 are positioned as the contacting surfaces when the collimator 40 is bonded and fixed to the base 92. Thus, adequate fixing force is exerted with respect to the curing shrinkage of the adhesive, and a high-precision optical module 91 can be manufactured.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

Although a capillary for an optical fiber, a rod lens, and a lens module were described as examples of the optical component, but the optical component may also be an optical waveguide device, an optical wavelength filter member, an optical crystal member, or an optical diffraction grating.

The entire disclosure of Japanese Patent Application No. 2004-237349 filed on Aug. 17, 2004 including specification, claims, drawings, and summary is incorporated herein by reference in its entirety.

What is claimed is:

1. A method of making an optical module, comprising:

preparing a first optical component having a substantially cylindrical elongated member, an outer peripheral portion of which includes a cylindrical portion and a side plane portion that has a flat surface, the flat surface being parallel to a central axis of the elongated member;

processing an end face of the first optical component while the first optical component is gripped using the side plane portion as a contacting surface;

positioning the first optical component while the first optical component is gripped using the side plane portion as a positioning reference; and forming a connection to a second optical component, wherein said positioning step includes aligning the azimuthal angle about the Z-axis of the first optical component while the first optical component is gripped using the side plane portion as a positioning reference.

2. The method of making an optical module according to claim 1, wherein said connection forming step is performed by adhesive.

3. The method of making an optical module according to claim 1, wherein said preparing step includes providing the first optical component and the second optical component with tilted connecting end faces, respectively.

4. The method of making an optical module according to claim 1, wherein in said preparing step the connecting end faces of the first optical component and the second optical component are tilted at a same angle.

* * * * *